US008035346B2

(12) United States Patent
Tsai

(10) Patent No.: US 8,035,346 B2
(45) Date of Patent: Oct. 11, 2011

(54) BATTERY PROTECTION CIRCUIT AND PROTECTION METHOD

(75) Inventor: Yung-Hsiang Tsai, Taipei County (TW)

(73) Assignee: Kinpo Electronics, Inc., New Taipei (TW)

( * ) Notice: Subject to any disclaimer, the term of this patent is extended or adjusted under 35 U.S.C. 154(b) by 506 days.

(21) Appl. No.: 12/248,569

(22) Filed: Oct. 9, 2008

(65) Prior Publication Data
US 2009/0322284 A1 Dec. 31, 2009

(30) Foreign Application Priority Data

Jun. 27, 2008 (TW) .............................. 97124282 A

(51) Int. Cl.
*H02J 7/00* (2006.01)
(52) U.S. Cl. ........................................ 320/136; 320/134
(58) Field of Classification Search .................. 320/136, 320/134
See application file for complete search history.

(56) References Cited

U.S. PATENT DOCUMENTS

| 5,252,411 A | | 10/1993 | Yokokawa et al. ............. 429/62 |
| 5,764,033 A | * | 6/1998 | Tamai ............................ 320/132 |
| 5,867,008 A | * | 2/1999 | Du et al. ......................... 320/136 |
| 6,577,105 B1 | * | 6/2003 | Iwaizono ....................... 320/134 |
| 6,804,100 B2 | * | 10/2004 | Astala ............................ 361/93.2 |
| 7,375,498 B2 | * | 5/2008 | Yamamoto ..................... 320/150 |
| 7,508,171 B2 | * | 3/2009 | Carrier et al. ................. 320/138 |
| 2001/0011884 A1 | * | 8/2001 | Sakakibara .................... 320/150 |

FOREIGN PATENT DOCUMENTS
CN 1177217 3/1998
* cited by examiner

*Primary Examiner* — M'Baye Diao
(74) *Attorney, Agent, or Firm* — J.C. Patents

(57) ABSTRACT

A battery protection circuit and protection method for a rechargeable battery is provided. The rechargeable battery includes a positive voltage pin, a negative voltage pin, and a temperature sensing pin. A resistance of the temperature sensing pin varies with the temperature of the rechargeable battery. The battery protection circuit includes a temperature and voltage detection unit and a discharging unit. The temperature and voltage detection unit is coupled between the positive voltage pin and the temperature sensing pin, and configured to determine the temperature of the rechargeable battery according to the resistance of the temperature sensing pin. The discharging unit discharges the rechargeable battery when the temperature of the rechargeable battery is higher than a predetermined temperature and stops discharging the rechargeable battery when a voltage of the positive voltage pin is lower than a first predetermined value.

10 Claims, 3 Drawing Sheets

Before Charging

After Charging

BATTERY PROTECTION CIRCUIT AND PROTECTION METHOD

CROSS-REFERENCE TO RELATED APPLICATION

This application claims the priority benefit of Taiwan application serial no. 97124282, filed Jun. 27, 2008. The entirety of the above-mentioned patent application is hereby incorporated by reference herein and made a part of this specification.

BACKGROUND OF THE INVENTION

1. Field of the Invention

The present invention generally relates to a battery protection circuit and a battery protection method, and more particularly, to a battery protection method that can reduce the swelling of the battery under high temperature environment.

2. Description of Related Art

With development of technology in light, small and portable electronic products, various high performance components of the products are being developed with a trend toward being light, thin and small. As a result, batteries that are light-weighted and small-sized and have a large capacity are becoming particularly important. In addition to the small size and large capacity, a battery protection circuit designed to prolong the life of the battery and provide security to the user can be also rather important. Typical battery protection circuits only work for batteries which are being used, which provide monitor and protect during the charging and discharging states of the batteries. These protection circuits includes, for example, circuits for overcharge monitoring, over-discharge monitoring, excess current and short protection.

During the course of using the battery, overcharge may be caused by a user's misuse, which may raise the temperature of the battery and cause electrolyte of the battery to decompose to generate gas thus increasing an internal pressure of the battery. The overcharge may also cause leakage of the interior chemical solution which places the battery at a risk of catching fire. As a result, the overcharge monitoring protection circuit is used to detect if the battery is overcharged to avoid the deterioration of performance, catching fire, and breakage of the battery, thereby ensuring the user's safety during using the battery. The over-discharge monitoring protection circuit detects abnormity during the course of discharging to ensure the life of the battery. The excess current and short protection circuit is used to break the connection between the battery and a load in case of a current abnormity of the battery and enable the battery to return back to normal operation after the abnormity disappears, thereby protecting the battery.

Although these battery protection circuits can provide monitoring and protection to batteries that are being used, they cannot protect batteries that are not being used. For example, when a cell phone or a digital camera is placed in an internal space of a car that has a high temperature, although the battery inside the cell phone or the digital camera is not being used, abnormity or swelling of the battery may still occur due to the high temperature environment, which would reduce the life of the battery that is not being used and place the user in danger.

SUMMARY OF THE INVENTION

Accordingly, the present invention is directed to a battery protection circuit that can reduce abnormal swelling and unrestorable chemical variations of a battery under high temperature environment to thereby prolong the life of the battery.

The present invention provides a battery protection circuit for a rechargeable battery. The rechargeable battery comprises a positive voltage pin, a negative voltage pin, and a temperature sensing pin. A resistance of the temperature sensing pin varies with the temperature of the rechargeable battery. The battery protection circuit comprises a temperature and voltage detection unit and a discharging unit. The temperature and voltage detection unit is coupled between the positive voltage pin and the temperature sensing pin, and configured to determine the temperature of the rechargeable battery according to the resistance of the temperature sensing pin. The discharging unit is coupled between the positive voltage pin and the temperature and voltage detection unit.

The discharging unit discharges the rechargeable battery when the temperature of the rechargeable battery is higher than a predetermined temperature and stops discharging the rechargeable battery when a voltage of the positive voltage pin is lower than a first predetermined value.

According to one embodiment of the present invention, the temperature and voltage detection unit comprises a bias voltage unit and a voltage detection unit. The bias voltage unit is coupled between the positive voltage pin and the temperature sensing pin, and configured to output a first voltage according to the resistance of the temperature sensing pin. The voltage detection unit coupled between the bias voltage unit and the positive voltage pin, and configured to output a discharging signal to the discharging unit according to the first voltage and a voltage outputted from the positive voltage pin. The discharging unit discharges the rechargeable battery in response to the discharging signal when the first voltage is lower than a second predetermined value.

According to one embodiment of the present invention, the bias voltage unit comprises a first resistor and a second resistor. One end of the first resistor is coupled to a voltage stabilizing pin connected to the positive voltage. The second resistor is coupled between the other end of the first resistor and the temperature sensing pin. A common node between the first resistor and the second resistor outputs the first voltage.

According to one embodiment of the present invention, the voltage detection unit comprises a voltage sensor, a bipolar junction transistor, a first resistor, and a second resistor. The voltage sensor is coupled to the bias voltage unit and outputs a low logic voltage level when the first voltage is lower than the second predetermined value. The bipolar junction transistor is coupled between an output of the voltage sensor and the discharging unit to generate the discharging signal. The first resistor is coupled between the base of the bipolar junction transistor and the positive voltage pin. The second resistor is coupled between the collector of the bipolar junction transistor and the positive voltage pin.

According to one embodiment of the present invention, the bipolar transistor is an NPN transistor. The collector of the bipolar transistor is coupled to the discharging unit to generate the discharging signal. The emitter of the bipolar transistor is coupled to the output of the voltage sensor. When the first voltage is lower than the second predetermined value, the discharging signal is at a low logic voltage level. When the voltage of the positive voltage pin is lower than the first predetermined value, the discharging signal is at a high logic voltage level.

According to one embodiment of the present invention, the discharging unit comprises a switch and a first resistor. One end of the switch is coupled to the positive voltage pin. The first resistor is coupled between the other end of the switch and a ground. When the temperature of the rechargeable battery is higher than the predetermined temperature, the switch is closed to discharge the rechargeable battery. When the voltage of the positive voltage pin is lower than the first predetermined value, the switch is opened to stop discharging the rechargeable battery.

According to one embodiment of the present invention, the switch is a P channel metal oxide semiconductor (PMOS) transistor. The source of the PMOS transistor is coupled to the positive voltage pin. The drain of the PMOS transistor is coupled to the first resistor. The gate of the PMOS transistor is coupled to the discharging signal.

In another aspect, the present invention provides a battery protection method for a rechargeable battery. The rechargeable battery comprises a positive voltage pin, a negative voltage pin, and a temperature sensing pin. A resistance of the temperature sensing pin varies with the temperature of the rechargeable battery. In the battery protection method, the temperature of the rechargeable battery is firstly detected. The rechargeable battery is discharged when the temperature of the rechargeable battery is higher than a predetermined temperature. The discharging of the rechargeable battery is stopped when a voltage of the positive voltage pin of the rechargeable battery is lower than a predetermined value.

According to one embodiment of the present invention, the step of detecting the temperature of the rechargeable battery further comprises determining the temperature of the rechargeable battery according to the resistance of the temperature sensing pin.

According to one embodiment of the present invention, a thermistor with a negative temperature coefficient is embedded in the rechargeable battery. The thermistor is coupled to the temperature sensing pin such that resistance of the temperature sensing pin varies with the temperature.

According to one embodiment of the present invention, a thermistor with a positive temperature coefficient is embedded in the rechargeable battery. The thermistor is coupled to the temperature sensing pin such that resistance of the temperature sensing pin varies with the temperature.

As described above, under high temperature environment, the battery protection circuit and method can discharge the battery with a saturation voltage while avoiding the over-discharging of the battery. This can reduce the swelling, breakage and otherwise unrestorable chemical damage of the battery due to high temperature, thus prolonging the life of the battery and improving the security of the battery.

In order to make the aforementioned and other features and advantages of the present invention more comprehensible, embodiments accompanied with figures are described in detail below.

DESCRIPTION OF THE EMBODIMENTS

First Embodiment

Figure 1:
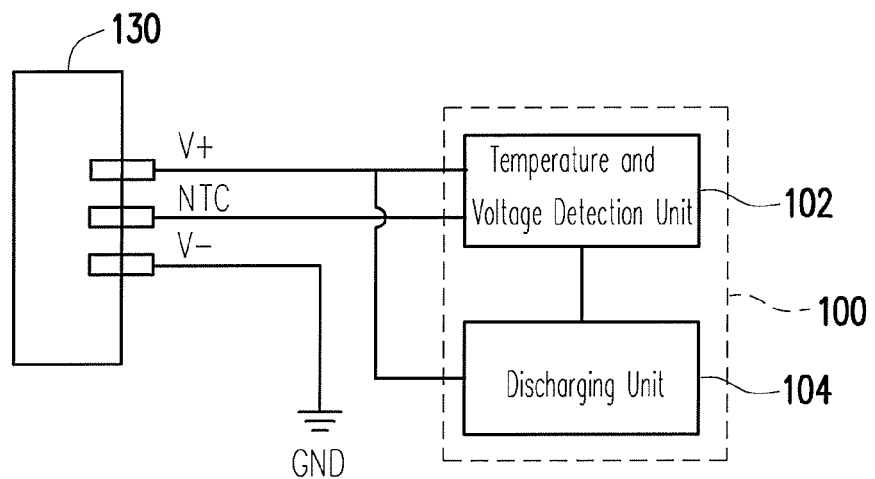
FIG. 1 is a functional diagram of a battery protection circuit according to one embodiment of the present invention.

FIG. 1 is a functional diagram of a battery protection circuit according to one embodiment of the present invention. Referring to FIG. 1, the battery protection circuit 100 is suitable for a rechargeable battery 130. The rechargeable battery 130 includes a positive voltage pin V+, a negative voltage pin V−, and a temperature sensing pin NTC. The battery protection circuit 100 includes a temperature and voltage detection unit 102, and a discharging unit 104. The temperature and voltage detection unit 102 is coupled to the positive voltage pin V+ and the temperature sensing pin NTC. The discharging unit 104 is coupled to the positive voltage pin V+ and the temperature and voltage detection unit 102. The resistance of the temperature sensing pin NTC of the rechargeable battery 130 varies with the temperature of the rechargeable battery 130. Accordingly, the temperature and voltage detection unit 102 determines the temperature of the rechargeable battery based on the resistance of the temperature sensing pin NTC. The discharging unit 104 determines whether to discharge the rechargeable battery 130 based on the temperature detection result of the temperature and voltage detection unit 102 and the voltage of the rechargeable battery 130.

Under high temperature environment, when a rechargeable battery 130 having an ordinary voltage (about 3.7 volt) is compared with a rechargeable battery 130 with a saturation voltage (about 4.2 volt), the rechargeable battery 130 with the ordinary voltage exhibits a lower degree and speed of swelling. As such, based on this characteristic of the rechargeable battery 130, it can be concluded that discharging the rechargeable battery having a saturation voltage under high temperature can help reduce the battery swelling speed and avoid damage to the battery.

Therefore, if the temperature and voltage detection unit 102 detects that the temperature of the rechargeable battery 130 is greater than a predetermined value based on the resistance of the temperature sensing pin NTC, the discharging unit 104 discharges the rechargeable battery 130 such that the rechargeable battery 130 is turned into an unsaturated state, thereby reducing unrestorable damage to the rechargeable battery that is caused by the high temperature, such as, swelling, breaking, or burning.

Although discharging can reduce the swelling of the rechargeable battery 130, over-discharge can cause a permanent failure or a shortened life of the rechargeable battery 130. Therefore, to avoid over-discharge, the discharging unit 104 stops discharging the rechargeable battery 130 if the voltage of the positive voltage pin V+ is lower than a predetermined value, i.e., the power capacity of the rechargeable battery is less than a predetermined value.

In summary, the discharging unit 104 determines whether to discharge the rechargeable battery 130 based on the temperature detected by the temperature and voltage detection unit 102, and determines whether to stop the discharge based on the power capacity of the rechargeable battery 130 (voltage of the positive voltage pin V+), thereby avoiding the damage to the rechargeable battery 130 having a saturation voltage due to the swelling under the high temperature, and avoiding the life reduction or permanent failure due to the over-discharge.

The predetermined temperature value used to determine whether to discharge or the predetermined voltage value used to determine whether to stop the discharge by the discharging unit 104 may be determined by the using environment and characteristics of the rechargeable battery 130. In one embodiment, the high temperature environment may be a closed internal space of a car exposed to the sun. In such an environment, the temperature of the internal space may be higher than 60 degrees or even as high as 100 degrees.

Figure 2:
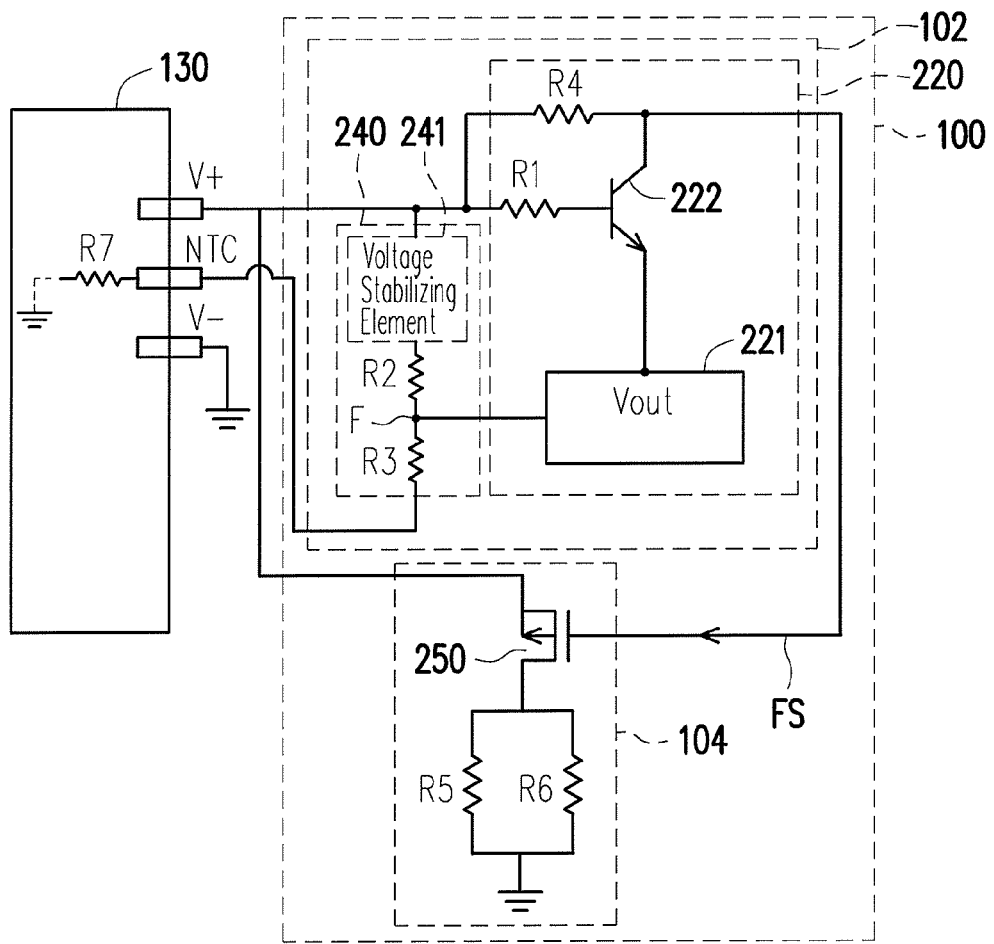
FIG. 2 is a block diagram of the battery protection circuit according to one embodiment of the present invention.

The circuit and operation of the circuit blocks of FIG. 1 are further described in detail below with reference to FIG. 2. FIG. 2 is a block diagram of the battery protection circuit according to one embodiment of the present invention. The battery protection unit 100 mainly includes the temperature and voltage detection unit 102 and the discharge unit 104. The temperature and voltage detection unit 102 includes a voltage detection unit 220 and a bias voltage unit 240. The voltage detection unit 220 is coupled to the bias voltage unit 240 and the positive voltage pin V+. The bias voltage unit 240 is coupled between a voltage stabilizing pin electrically connected between the positive voltage V+ and the temperature sensing pin NTC.

The bias voltage unit 240 includes a voltage stabilizing element 241 and precise regulating resistors R2, R3 that are connected in series. According to the voltage dividing principle, the voltage of a node F varies with the resistance of the temperature sensing pin NTC. In this embodiment, the temperature sensing pin is illustrated as a negative temperature coefficient (NTC) thermistor and, therefore, the resistance of the thermistor R7 of the rechargeable battery 130 is decreased with the rise of the temperature. Therefore, the voltage of the node F is decreased with the temperature rise and increased with the temperature decrease.

The voltage detection unit 220 of the temperature and voltage detection unit 102 includes a voltage sensor 221, a bipolar junction transistor 222, a precise regulating resistor R1, and a switch control resistor R4. In the present embodiment, the bipolar junction transistor 222 is a NPN bipolar junction transistor. The collector of the bipolar junction transistor 222 is coupled to the discharging unit 104, the emitter is coupled to an output of the voltage sensor 221, and the base is coupled to the precise regulating resistor R1. The voltage sensor 221 is coupled between the node F of the bias voltage unit 240 and the emitter of the bipolar junction transistor 222. The precise regulating resistor R1 is coupled between the positive voltage pin V+ of the rechargeable battery 130 and the base of the bipolar junction transistor 222. The switch control resistor R4 is coupled between the collector of the bipolar junction transistor 222 and the positive voltage pin V+.

The voltage sensor 221 adjusts the voltage level of the voltage detection output Vout in response to the voltage of the node F. If the voltage of the node F is lower than a predetermined value (which indicates that the temperature of the rechargeable battery is higher than a predetermined temperature), the voltage detection output Vout of the voltage sensor 221 is at a logic low voltage level. Because the precise regulating resistor R1 is coupled between the base of the bipolar junction transistor 222 and the positive voltage pin V+, the switch control resistor R4 is coupled between the collector of the bipolar junction transistor 222 and the positive voltage pin V+, and the emitter of the bipolar junction transistor 222 is coupled to the voltage detection output Vout of the voltage sensor 221, when the output voltage generated by the voltage detection output Vout of the voltage sensor 221 is at a logic low voltage level, the voltage difference between the positive voltage pin V+ and the voltage detection output Vout turns the bipolar junction transistor 222 on, thus generating a low voltage at the collector of the bipolar junction transistor 222 (due to a voltage drop caused by a current flowing through the switch control resistor R4).

A discharging signal FS outputted by the temperature and voltage detection unit 102 is formed by the voltage of the collector of the bipolar junction transistor 222. When the discharging signal FS becomes a low voltage level due to the turn-on of the bipolar junction transistor 222 (which indicates that the temperature of the rechargeable battery is higher than the predetermined temperature), a switch 250 (illustrated as a PMOS transistor in the present embodiment) of the discharging unit 104 is closed accordingly, and the rechargeable battery 130 is then discharged through discharging resistors R5, R6.

In the illustrated embodiment, the switch 250 is a PMOS transistor; the discharging resistors R5, R6 are coupled in parallel between the drain of the PMOS transistor 250 and a ground GND. The main purpose of the discharging resistors R5 and R6 is to provide a path of discharging for the rechargeable battery 130 and consume the power, and there should be no limit as to the number of the discharging resistors. Taking the size, cost and heat dissipation into account, two ½ W resistors are used to implement the circuit of the discharging unit in the present embodiment. A suitable example of the voltage sensor 221 of the temperature and voltage detection unit 102 may be the voltage sensor provided by Zhong Ke Guan Company, with a model No. R3112Q151A-TR-F.

In addition, since the rechargeable battery has a prescribed cut off voltage, over-discharge will cause a shortened life or even a permanent failure of the rechargeable battery. Accordingly, a discharge cut off voltage is considered in designing the circuit in the present embodiment such that when the voltage of the rechargeable battery (the positive voltage pin V+) is lower than a predetermined voltage, the temperature and voltage detection unit 102 causes the discharging unit 104 to stop discharging the rechargeable battery. In the present embodiment, the resistance of the precise regulating resistor R1 (e.g., 91KΩ) may be determined based on the internal resistance of the bipolar junction transistor 222 and the bias voltage for turning the bipolar junction transistor 222 on. When the voltage of the positive voltage pin V+ is unduly low such that the discharging signal FS becomes a high voltage level to open the switch 250, the discharging unit 104 stops discharging the rechargeable battery 130.

During discharging, the voltage level of the rechargeable battery 130 tends to decrease, which is used to control the turn-on/turn-off states of the bipolar junction transistor 222 in the present embodiment. The voltage level that makes the bipolar junction transistor 222 turn off is determined based on the resistance of the precise regulating resistor R1. When the voltage level of the rechargeable battery 130 is lower than a predetermined value (e.g., 3.7V), the bipolar junction transistor 22 is caused to turn off such that the discharging FS becomes a high voltage level (approaching the voltage level of the positive voltage pin V+). At this time, the switch 250 is opened (turned off) to stop the discharging to the rechargeable battery.

In summary, in the present embodiment, when the temperature of the rechargeable battery 130 is higher than a predetermined temperature, the discharging signal FS outputted by the temperature and voltage detection unit 102 becomes a low voltage level (because the bipolar junction transistor 222 is turned on) and, at this time, the discharging unit 104 discharges the rechargeable battery 130. During discharging, when the voltage of the rechargeable battery 130 is lower than a predetermined value, the discharging signal FS becomes a high voltage level (because the bipolar junction transistor 222 is turned off) and, at this time, the discharging unit 104 stops discharging the rechargeable battery 130.

In addition, it should be noted that, the thermistor R7 of the rechargeable battery 130 is coupled to the temperature sensing pin NTC and may have a negative temperature coefficient (NTC) or a positive temperature coefficient (PTC). In the present embodiment, the thermistor R7 is illustrated as a NTC thermistor. The circuits of the temperature and voltage detection unit 102 and the discharging unit 104 described above are only examples of the present invention, and the present invention should not be limited to the circuits illustrated in FIG. 2. Since alternative embodiments of the circuit within the scope of the present invention will occur to those skilled in the art upon reading the disclosure described herein, these alternative embodiments are not described herein.

Second Embodiment

Figure 3:
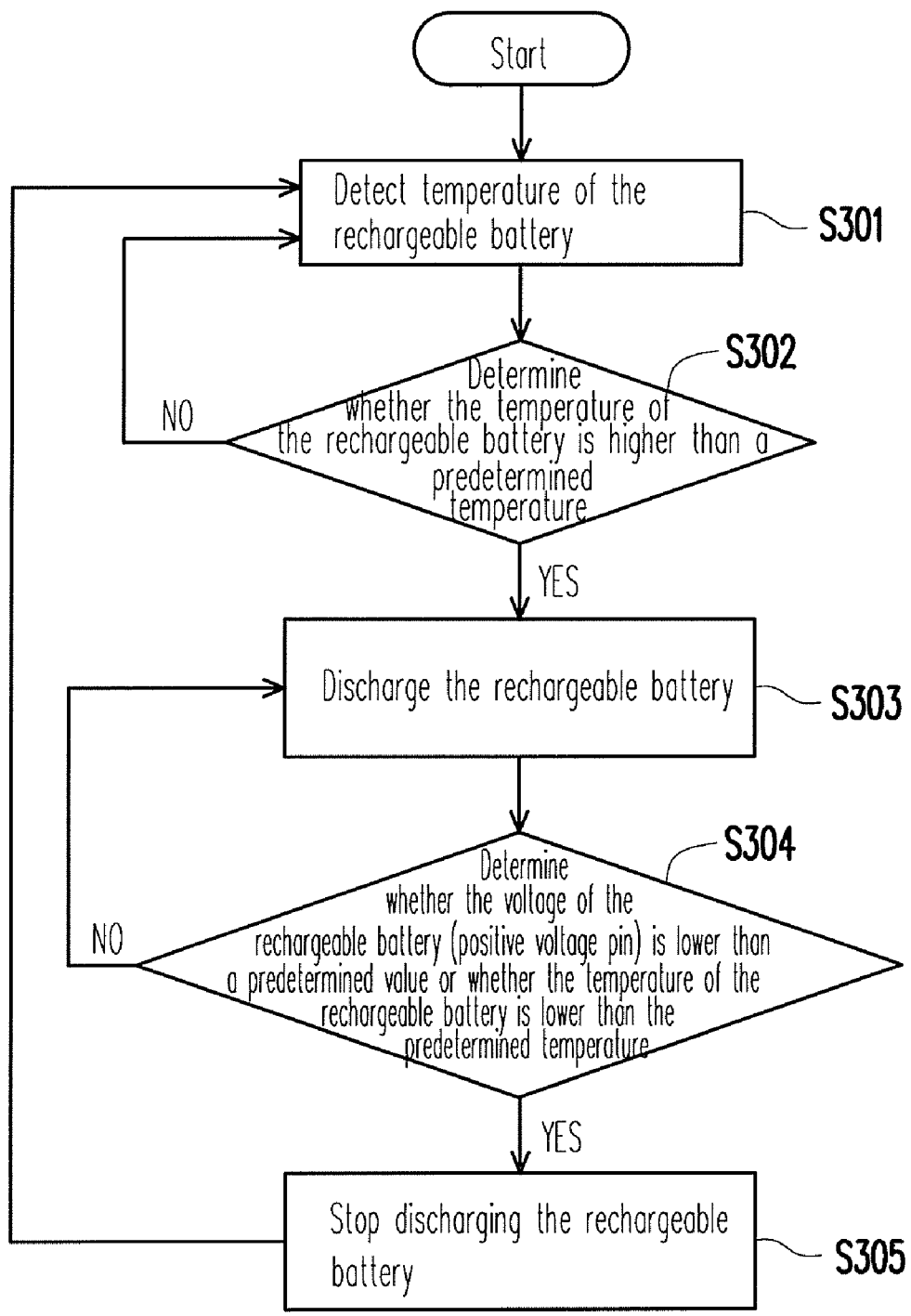
FIG. 3 is a flow chart of a battery protection method according to one embodiment of the present invention.

The present invention also provides a battery protection method that can be concluded from the embodiment described above. FIG. 3 illustrates a flow chart of a battery protection method according to one embodiment of the present invention. Referring to FIG. 3, at step S301, firstly, the temperature and voltage detection unit detects the temperature of the rechargeable battery based on the resistance of the temperature sensing pin of the rechargeable battery. Next, at step S302, it is determined whether the temperature of the rechargeable battery is greater than a predetermined temperature. If the temperature is not greater than the predetermined temperature (i.e., as indicated by "No" in step S302), then step S301 is repeated to keep detecting the temperature of the rechargeable battery.

On the other hand, if the temperature of the rechargeable battery is greater than the predetermined temperature at step S302 (i.e., as indicated by "Yes" in step S302), then the discharging unit discharges the rechargeable battery at step S303. Next, at step S304, it is determined whether the voltage of the rechargeable battery (the output of the positive voltage pin) is lower than a predetermined value or whether the temperature of the rechargeable battery is lower than the predetermined temperature. The step S304 is performed to avoid the damage to the rechargeable battery due to over-discharge. Therefore, if the voltage of the positive voltage pin is not lower than the predetermined value (i.e., as indicated by "No" in step S304), the step S303 is repeated to keep discharging the rechargeable battery. If the voltage of the positive voltage pin is lower than the predetermined value or the temperature of the rechargeable battery is lower than the predetermined temperature (i.e., as indicated by "Yes" in step S304), the discharging unit stops discharging the rechargeable battery and, subsequently, the steps S301 to S305 are repeated to continuously detect and protect the rechargeable battery.

Details of the present embodiment within the scope of the present invention will occur to those skilled in the art upon reading the previously described first embodiment and are thus not repeated herein.

Table 1 shows the measurements of the battery thickness at 25° C. and 85° C. Referring to Table 1, it shows three states of the battery, including: thickness of a battery that does not employ the circuit of the present invention and is under room temperature (25° C.), thickness of a battery that does not employ the circuit the present invention and has been disposed under 85° C. environment for eight hours, and thickness of a battery that employs the circuit the present invention and has been disposed under 85° C. environment for eight hours.

TABLE 1

| Battery | Thickness of a battery that does not employ the circuit of the present invention and is under room temperature | | Thickness of a battery that does not employ the circuit the present invention and has been disposed under 85° C. environment for eight hours | | Thickness of a battery that employs the circuit the present invention and has been disposed under 85° C. environment for eight hours | |
|---|---|---|---|---|---|---|
| | Thickness before charging (3.8 V) | Thickness after charging (4.2 V) | Thickness before charging (3.8 V) | Thickness after charging (4.2 V) | Thickness before charging (3.8 V) | Thickness after charging (4.2 V) |
| Battery No. 1 | 4.67 mm | 4.7 mm | 4.84 mm | 5.23 mm | 4.88 mm | 4.97 mm |
| Battery No. 2 | 4.63 mm | 4.67 mm | 4.77 mm | 5.16 mm | 4.75 mm | 4.81 mm |
| Battery No. 3 | 4.68 mm | 4.75 mm | 4.89 mm | 5.22 mm | 4.77 mm | 4.86 mm |

The thickness of the rechargeable batteries before charging (3.7V) and after charging (4.2V) is measured under each of the three states. It can be found from the actual measurements of the three batteries under different states as shown in Table 1 that, when the temperature rises from the room temperature (25° C.) to the high temperature 85° C., the swelling amount of the thickness of the battery employing the circuit of the present invention is certainly less than that of the battery not employing the circuit of the present invention. In particular, for the batteries that have been charged, the swelling amount of the thickness of the battery employing the circuit of the present invention due to the temperature rise is significantly less than that of the battery not employing the circuit of the present invention. To what extent the circuit of the present invention can reduce the swelling of the battery is clearly illustrated below with respect to a swelling rate of the battery.

Table 2 is a chart showing swelling rates calculated based on the thickness of the batteries of Table 1. Referring to Table 2, the swelling rate of the batteries before charging and the swelling rate of the batteries after charging are respectively calculated with respect to the temperature rise from 25° C. to 85° C. In addition, Table 2 also shows the swelling rate of the batteries before employing the circuit of the present invention, the swelling rate of the batteries after employing the circuit of the present invention, and reduction values of the swelling rates (the difference between the swelling rates of the batteries before and after employing the circuit of the present invention). Thus, the swelling reduction result achieved by the circuit of the present invention can be apparent from these reduction values of the swelling rates.

TABLE 2

| | Swelling rate of the battery before charging (3.8 V) when the temperature rises from 25° C. to 85° C. | | | Swelling rate of the battery after charging (4.2 V) when the temperature rises from 25° C. to 85° C. | | |
|---|---|---|---|---|---|---|
| Batteries | Not employing the circuit of the present invention | Employing the circuit of the present invention | Reduction value of the swelling rate | Not employing the circuit of the present invention | Employing the circuit of the present invention | Reduction value of the swelling rate |
| Battery No. 1 | 5.78% | 4.49% | 1.29% | 11.28% | 5.74% | 5.54% |
| Battery No. 2 | 3.02% | 2.59% | 0.43% | 10.49% | 3.85% | 6.64% |
| Battery No. 3 | 4.49% | 1.92% | 2.57% | 9.89% | 2.31% | 7.58% |

Firstly, the reduction of the swelling rates of the batteries before charging is discussed. It can be found from the reduction values of the swelling rates of the battery No. 1, battery No. 2 and battery No. 3 that the circuit of present invention decreases the swelling rate of the battery no matter whether the battery has not been charged yet or has been charged. This is because the environment temperature is higher than the predetermined temperature such that the battery protection circuit of the present invention is enabled to discharge the battery, and the voltage before charging (3.8V) is not lower than the predetermined voltage such that the battery protection circuit still discharges the battery before charging. The function of the circuit of the present invention can thus be apparent from the reduction values of the swelling rates. Then, the reduction of the swelling rates of the batteries after charging is further discussed. When compared with the reduction values of the swelling rates of the batteries before charging, the reduction values of the swelling rates of the batteries after charging are relatively larger. This is because the swelling problem of the battery that has been charged and does not employ the circuit of the present invention due to the high temperature is so serious that after the circuit of the present invention is employed, the swelling of the battery that has been charged can be significantly reduced.

Figure 4:
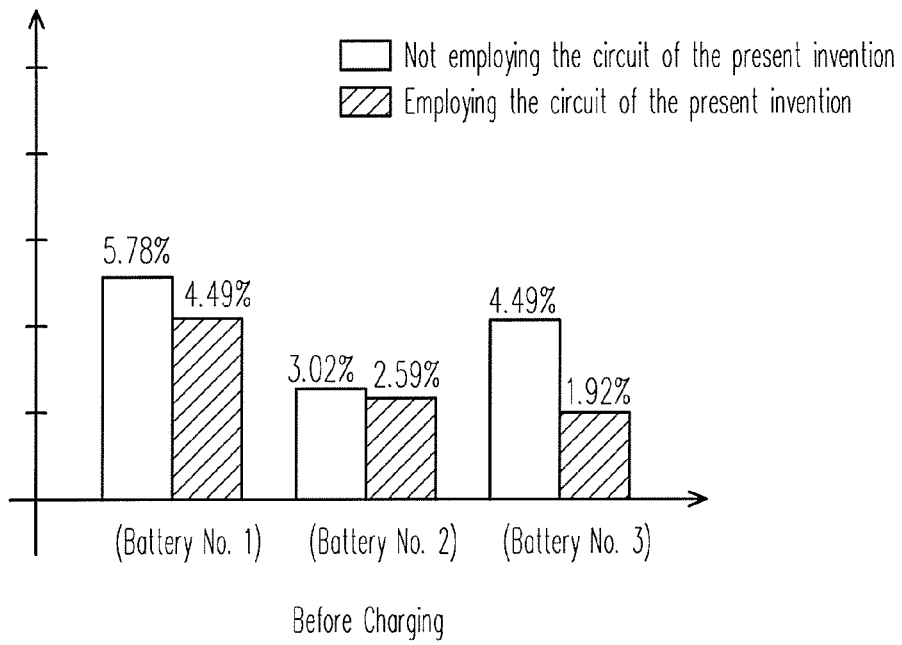
FIG. 4 is a column chart illustrating the swelling rates of the batteries before charging according to one embodiment of the present invention.
Figure 5:
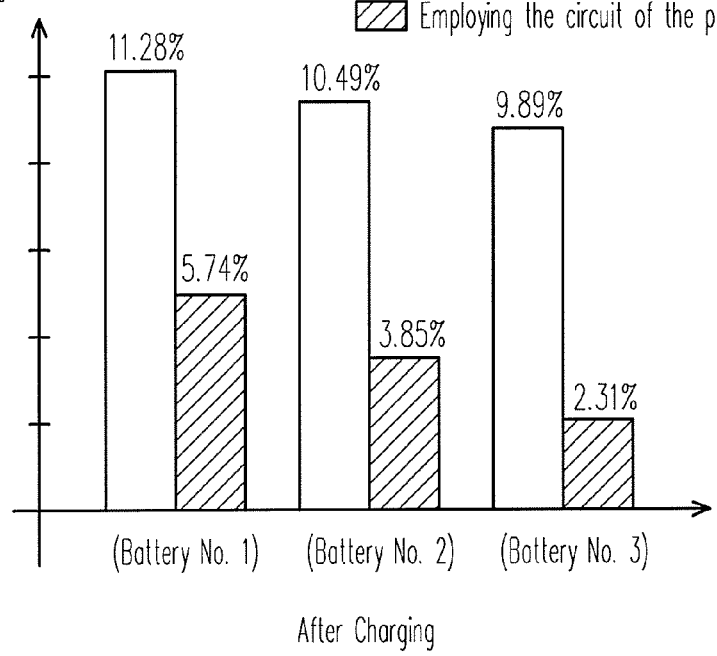
FIG. 5 is a column chart illustrating the swelling rates of the batteries after charging according to one embodiment of the present invention.

FIG. 4 is a column chart illustrating the swelling rates of the batteries before charging according to one embodiment of the present invention. FIG. 5 is a column chart illustrating the swelling rates of the batteries after charging according to one embodiment of the present invention. The column charts of FIG. 4 and FIG. 5 are made according to the swelling rates of Table 2. Referring to FIG. 4, as to battery No. 1, when not employing the circuit of the present invention, the battery before charging has a swelling rate of 5.78%. After employing the circuit of the present invention, the swelling rate is 4.49%. Therefore, when the battery before charging employs the circuit of the present invention, the swelling rate is reduced by 1.29%. Referring to FIG. 5, when not employing the circuit of the present invention, the swelling rate of the battery No. 1 after charging (4.2V) due to the high temperature 85° C. is increased to 11.28%. However, when employing the circuit of the present invention, the swelling rate is reduced to 5.74%, thus resulting in a swelling rate reduction of 5.54%. Referring to FIG. 4 and FIG. 5, it can be found from the swelling rates of the batteries No. 1, No. 2, No. 3, that the battery protection circuit of the present invention can significantly reduce the swelling of the battery under the high temperature, and more particularly, can significantly reduce the swelling of the battery that has been charged.

In summary, according to the battery protection circuit and protection method of the present invention, the battery can be discharged in response to the temperature of the battery. This can avoid the swelling or abnormal damage of the battery in an unused state, thereby prolonging the life of the battery and increasing the security in using the battery.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A battery protection circuit for a rechargeable battery, the rechargeable battery comprising a positive voltage pin, a negative voltage pin, and a temperature sensing pin, a resistance of the temperature sensing pin varying with the temperature of the rechargeable battery, the battery protection circuit comprising:

a temperature and voltage detection unit coupled between the positive voltage pin and the temperature sensing pin, and configured to determine the temperature of the rechargeable battery according to the resistance of the temperature sensing pin; and a discharging unit coupled between the positive voltage pin and the temperature and voltage detection unit;

wherein the discharging unit is configured to discharge the rechargeable battery when the temperature of the rechargeable battery is higher than a predetermined temperature and stop discharging the rechargeable battery when a voltage of the positive voltage pin is lower than a first predetermined value, wherein the temperature and voltage detection unit comprises:

a bias voltage unit coupled between the positive voltage pin and the temperature sensing pin, and configured to output a first voltage according to the resistance of the temperature sensing pin; and a voltage detection unit coupled between the bias voltage unit and the positive voltage pin, and configured to output a discharging signal to the discharging unit according to the first voltage and a voltage outputted from the positive voltage pin;

wherein the discharging unit is configured to discharge the rechargeable battery in response to the discharging signal when the first voltage is lower than a second predetermined value.

2. The battery protection circuit according to claim 1, wherein the bias voltage unit comprises:

a voltage stabilizing unit with one end coupled to the positive voltage pin;

a first resistor with one end coupled to the voltage stabilizing unit; and a second resistor coupled between the other end of the first resistor and the temperature sensing pin;

wherein a common node between the first resistor and the second resistor outputs the first voltage.

3. The battery protection circuit according to claim 1, wherein the voltage detection unit comprises:

a voltage sensor coupled to the bias voltage unit and configured to output a low logic level voltage when the first voltage is lower than the second predetermined value;

a bipolar junction transistor coupled between an output of the voltage sensor and the discharging unit to generate the discharging signal;

a first resistor coupled between the base of the bipolar junction transistor and the positive voltage pin; and a second resistor coupled between the collector of the bipolar junction transistor and the positive voltage pin.

4. The battery protection circuit according to claim 3, wherein the bipolar junction transistor is an NPN transistor, the collector of the bipolar junction transistor is coupled to the discharging unit to generate the discharging signal, the emitter of the bipolar junction transistor is coupled to the output of the voltage sensor, when the first voltage is lower than the second predetermined value, the discharging signal is at a low logic voltage level, when the voltage of the positive voltage pin is lower than the first predetermined value, the discharging signal is at a high logic voltage level.

5. The battery protection circuit according to claim 1, wherein the discharging unit comprises:

a switch with one end coupled to the positive voltage pin; and a first resistor coupled between the other end of the switch and a ground;

wherein when the temperature of the rechargeable battery is higher than the predetermined temperature, the switch is closed to discharge the rechargeable battery, when the voltage of the positive voltage pin is lower than the first predetermined value, the switch is opened to stop discharging the rechargeable battery.

6. The battery protection circuit according to claim 5, wherein the discharging unit further comprises a second resistor coupled in parallel with the first resistor.

7. The battery protection circuit according to claim 5, wherein the switch is a PMOS transistor, the source of the PMOS transistor is coupled to the positive voltage pin, the drain of the PMOS transistor is coupled to the first resistor, and the gate of the PMOS transistor is coupled to the discharging signal.

8. The battery protection circuit according to claim 5, wherein a thermistor with a negative temperature coefficient is embedded in the rechargeable battery and the thermistor is coupled to the temperature sensing pin such that resistance of the temperature sensing pin varies with the temperature.

9. The battery protection circuit according to claim 1, wherein a thermistor with a positive temperature coefficient is embedded in the rechargeable battery and the thermistor is coupled to the temperature sensing pin such that resistance of the temperature sensing pin varies with the temperature.

10. The battery protection circuit according to claim 1, wherein the negative voltage pin is coupled to a ground.

* * * * *